United States Patent
Wilson et al.

(10) Patent No.: US 10,411,744 B1
(45) Date of Patent: Sep. 10, 2019

(54) WAVEFORM TRANSFORMATION AND RECONSTRUCTION

(71) Applicant: RAYTHEON COMPANY, Waltham, MA (US)

(72) Inventors: David B. Wilson, Goleta, CA (US); Loyra G. Dirzo, Goleta, CA (US); Jose A. Ruvalcaba, Goleta, CA (US)

(73) Assignee: Ratheon Company, Waltham, MA (US)

( * ) Notice: Subject to any disclaimer, the term of this patent is extended or adjusted under 35 U.S.C. 154(b) by 0 days.

(21) Appl. No.: 16/157,575

(22) Filed: Oct. 11, 2018

(51) Int. Cl.
 *H04B 1/10* (2006.01)
 *H04L 27/00* (2006.01)
 *H04K 3/00* (2006.01)

(52) U.S. Cl.
 CPC ............. *H04B 1/1027* (2013.01); *H04K 3/60* (2013.01); *H04L 27/0012* (2013.01)

(58) Field of Classification Search
 CPC ..... H04B 1/1027; H04K 3/60; H04L 27/0012
 See application file for complete search history.

(56) References Cited

U.S. PATENT DOCUMENTS

| | | | |
|---|---|---|---|
| 4,713,662 A | 12/1987 | Wiegand | |
| 5,546,497 A | 8/1996 | Kao | |
| 5,812,737 A | 9/1998 | Wang | |
| 5,949,821 A * | 9/1999 | Emami | H03D 3/009 333/28 T |
| 6,236,687 B1 * | 5/2001 | Caso | H04L 1/0057 375/327 |
| 6,246,729 B1 * | 6/2001 | Richardson | H04L 27/22 329/345 |
| 7,340,375 B1 | 3/2008 | Patenaud et al. | |
| 7,480,234 B1 | 1/2009 | Hart et al. | |

(Continued)

FOREIGN PATENT DOCUMENTS

| | | |
|---|---|---|
| GB | 2300093 | 10/1996 |
| WO | 2013184232 | 12/2013 |

*Primary Examiner* — Jaison Joseph
(74) *Attorney, Agent, or Firm* — Burns & Levinson, LLP; Joseph M. Maraia (57) ABSTRACT

A method for transforming and reconstructing a signal includes receiving a plurality of samples of a waveform of the signal at different points in time. The waveform of the signal is transformed, for each sample, into an in-phase (I) component and a quadrature (Q) component. A derotational circuit applies a delayed complex conjugate multiple (DCM) to the signal to determine a constant product having an I component ($I_c$) and a Q component ($Q_c$). A magnitude component is determined based on $I_c$ and $Q_c$. A delta phase component is determined based on $I_c$ and $Q_c$. The magnitude component is processed to create a processed magnitude component. The delta phase component is processed to create a processed delta phase component. An IQ waveform is created by reconstructing the waveform of the signal based on the processed magnitude component and the processed phase component.

17 Claims, 5 Drawing Sheets

(56) References Cited

U.S. PATENT DOCUMENTS

| | | |
|---|---|---|
| 8,761,233 B2 | 6/2014 | Savage et al. |
| 2003/0043947 A1 | 3/2003 | Zehavi et al. |
| 2005/0232194 A1 | 10/2005 | Hanna et al. |
| 2006/0215778 A1* | 9/2006 | Murthy ................. G06F 1/0353 375/260 |
| 2009/0225918 A1 | 9/2009 | Telukuntla et al. |
| 2009/0323835 A1 | 12/2009 | Rao et al. |
| 2010/0054367 A1 | 3/2010 | Gorday et al. |
| 2010/0195772 A1 | 8/2010 | Kodama et al. |
| 2012/0112847 A1* | 5/2012 | Nakamura ............ H03F 1/0205 332/145 |
| 2015/0103169 A1* | 4/2015 | Verret ..................... G06T 5/003 348/147 |
| 2017/0111069 A1* | 4/2017 | Dafesh ................. H04B 1/1027 |

\* cited by examiner

WAVEFORM TRANSFORMATION AND RECONSTRUCTION

FIELD OF THE INVENTION

The present disclosure relates generally to the field of signal processing. More particularly, this disclosure relates to waveform reconstruction.

BACKGROUND OF THE INVENTION

In modern applications such as radar detection and location, digital receivers are used to detect and characterize (e.g., determine a frequency of) electromagnetic signals (pulses). Such receivers are useful for various purposes including, for example, commercial communications, surveillance, and modern warfare applications such as threat detection, and/or threat location. Digital receivers monitor electromagnetic energy to detect and characterize potential threat signals (e.g., enemy radar). These signals are obscured by noise that is internally generated in the receiver as well as noise from external sources.

The signal to noise ratio (SNR) is the ratio of the power of the signal of interest (SOI) relative to the power of the noise (or unwanted signal). SNR is typically measured in terms of decibels (dB). When the SOI is more powerful than the noise, the SNR is described as a positive number of decibels. When the noise is more powerful than the SOI, the SNR is described as a negative number of decibels.

When the SNR is lower than the pulse detection sensitivity limits of a digital receiver, the digital receiver becomes ineffective because potential threat signals can be missed and/or false threats may be detected. Additionally, even when a potential threat signal is detected, the SNR may be lower than the characterization sensitivity limits of the digital receiver, thereby preventing accurate characterization of the threat signal. As a result, systems with undesirable SNR can have poor sensitivity and either fail to detect threats or, if the threat is detected, they may characterize the threat improperly. Furthermore, processes for improving SNR to increase sensitivity often call for complex filters and/or calculations that can result in increased cost and/or long latency.

SUMMARY OF THE INVENTION

In light of the items described above, there is a need for a system and/or method for analyzing a received waveform, determining its identifying characteristics and then reconstituting the waveform into a desired waveform. The desired waveform may either be a signal that emulates the received signal (but with an improved SNR) or it may be a signal that has been modified from the original signal. The outgoing signal may have changes to its frequencies, modulations or phase. The changes may be performed on the fly in real time or it may be stored and retransmitted. The subject disclosure consists of a way to perform the above waveform modifications with a minimum of processing and not require the onerous process/computation laden approaches in use today that often burdens computational devices and introduces latency into the system.

The processing described above can be divided into two major portions: that of enhancing and characterizing a received waveform (improving SNR and determining frequency); and that of constructing new waveforms and retransmitting them. A very efficient process for accomplishing the first has already been disclosed in U.S. Pat. No. 9,553,620 (the '620 patent) entitled Signal Detection and Characterization issued on Jan. 24, 2017, which is incorporated herein in its entirety by reference. This disclosure relates to a process for accomplishing the second. To that end, the subject technology reconstructs a decomposed waveform into new desired waveforms using the processing described below.

In at least one aspect, the subject technology relates to a method for transforming and reconstructing a signal. A plurality of samples of a waveform of the signal are received at different points in time. The waveform of the signal is transformed, for each sample, into an in-phase (I) component and a quadrature (Q) component. A derotational circuit determines a constant product for the signal by applying a delayed complex conjugate multiple (DCM) to the signal using the I components and the Q components of the samples, the constant product having an I component ($I_c$) and a Q component ($Q_c$). A magnitude component is determined based on $I_c$ and $Q_c$. A delta phase component is determined based on $I_c$ and $Q_c$. The magnitude component and the delta phase component are separately processed to create a processed magnitude component from the magnitude component and a processed delta phase component from the delta phase component. An IQ waveform is created by reconstructing the waveform of the signal based on the processed magnitude component and the processed phase component.

In some embodiments, creating the IQ waveform includes determining a waveform based on the processed delta phase component and multiplying said waveform by the processed magnitude component. In some cases, the IQ waveform is rebroadcast. In some embodiments, processing the magnitude component comprises at least one of the following: upsampling by interpolation; downsampling by decimation. Processing the delta phase component can comprise at least one of the following: upsampling by interpolation; downsampling by decimation. Creating the IQ waveform can comprise summing a plurality of processed delta phase values and using a lookup table.

In some embodiments, processing the delta phase component includes frequency shifting by modifying the delta phase component by a constant. In some cases, processing the magnitude component includes subtracting a noise floor. Processing the delta phase can comprise optionally adding chirp. In some embodiments, processing the delta phase comprises demodulation by removing chirp. Processing the delta phase can comprise adding a phase shift by adding a spike. In some embodiments, after determining the constant product, $I_c$ and $Q_c$ and smoothed. The delta phase component can be given by:

$$\Phi = \tan^{-1}\left(\frac{Qc}{Ic}\right).$$

In some embodiments, after determining the constant product, $I_c$ and $Q_c$ are smoothed. In such a case, processing the magnitude components can comprise: upsampling by interpolation or downsampling by decimation; and subtracting a noise floor. Additionally, processing the delta phase component can comprise: upsampling by interpolation or downsampling by decimation; modulation or demodulation; and adding a phase shift.

In some embodiments, prior to rebroadcasting, a power amplifier is applied to the signal such that the IQ waveform is rebroadcast at an increased power and decreased noise to extend link margin. In some embodiments, rebroadcasting the IQ waveform is done continuously to act as a repeater. In some embodiments, prior to rebroadcasting, the IQ waveform is modified to act as a jamming signal.

BRIEF DESCRIPTION OF THE DRAWINGS

So that those having ordinary skill in the art to which the disclosed system pertains will more readily understand how to make and use the same, reference may be had to the following drawings in which like numerals represent like parts.

DETAILED DESCRIPTION

The subject technology overcomes many of the prior problems associated with transforming and reconstructing waveforms. In brief summary, the subject technology provides a method and system of transforming a waveform with an improved SNR without the need for complex processing. The advantages, and other features of the systems and methods disclosed herein, are made more readily apparent to those having ordinary skill in the art from the following detailed description of certain preferred embodiments taken in conjunction with the drawings which set forth representative embodiments of the present invention. Like reference numerals are used herein to denote like parts.

The particulars shown herein are by way of example and for purposes of illustrative discussion of the embodiments only and are presented in the interest of providing what is believed to be the most useful and readily understood description of the principles and conceptual aspects of the disclosure. In this regard, no attempt is made to show structural details of the subject matter in more detail than is necessary for the fundamental understanding of the disclosure, the description taken with the drawings making apparent to those skilled in that how the several forms of the present disclosure may be embodied in practice. Notably, in at least some of the drawings and descriptions contained herein, components which are well known and understood in the art (such as linear interpolation and smoothing) are omitted for the sake of simplicity.

Figure 1:
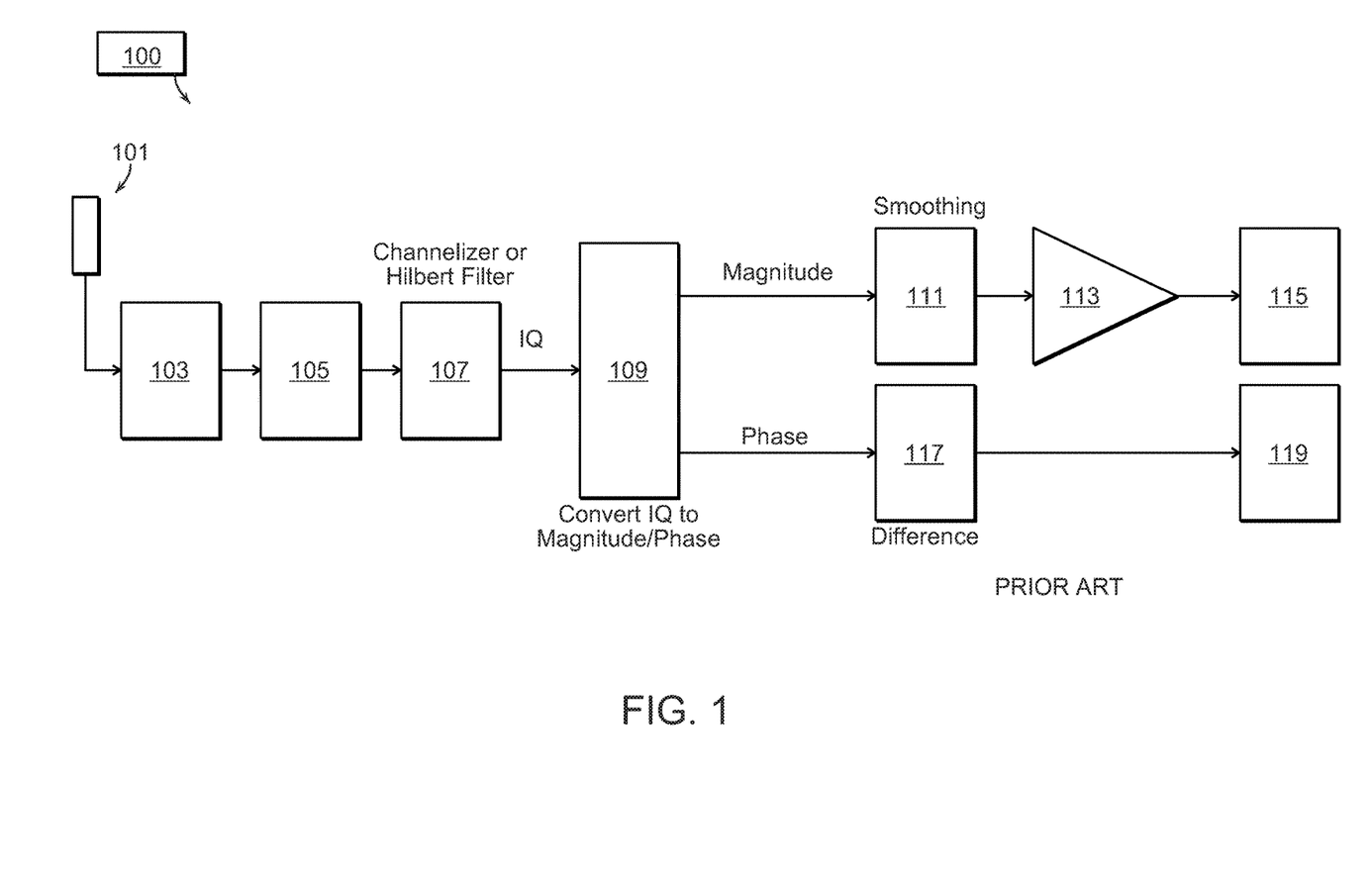
FIG. 1 is a block diagram of a conventional signal detection and characterization signal.

Referring now to FIG. 1, a block diagram of a conventional system 100 for detecting and characterizing signals is shown. The conventional system 100 includes an antenna 101 for receiving an analog electromagnetic signal of interest (SOI). The conventional system 100 also includes an analog conditioning element 103 such as a voltage amplifier for increasing the amplitude of a weak signal and/or a passive filter and/or an active filter for restricting signals outside of a desired frequency band. While the analog conditioning element 103 conditions the SOI, the analog conditioning element 103 also adds internally generated noise which may obscure the SOI. The conventional system 100 also includes an analog to digital converter (ADC) 105 (e.g., a Wilkinson ADC, a successive-approximation ADC, flash ADC) for converting a continuous physical property (usually voltage) of the analog SOI to a digital number representing the property's amplitude (i.e., a digital signal). A channelizer which partitions the total band being analyzed into sub-bands (or alternatively a Hilbert filter 107) is then applied to the digital signal to convert it to an IQ format.

The conventional system 100 also includes a converter 109 (e.g., a processor, field programmable gate array (FPGA), a microprocessor, and or any other suitable processing device) for converting the in-phase (I) and quadrature-phase (Q) components of the IQ signals into magnitude and phase components according to the relationships:

$$A(t) = \text{SQRT}(I^2 + Q^2) \qquad \text{Eqn. 1}$$

and $$\varphi(t) = \arctan\left(\frac{Q(t)}{I(t)}\right) \qquad \text{Eqn. 2}$$

where t is time, A(t) is magnitude and is described in terms of signal strength, often expressed in terms of dB, and $\varphi(t)$ is phase and is measured in, for example, degrees or radians, and represents a fraction of the wave cycle of the signal which has elapsed relative to the origin of that particular wave cycle at the time of sampling.

The conventional system 100 can apply one or more filters 111 to smooth the magnitude component of each digital IQ signal. Smoothing the magnitude component using, for example, a moving average filter reduces the impact of noise on the signal by, removes obsolete sample data and deemphasizes outliers in the data stream, providing a cleaner signal. The conventional system 100 then uses a pulse detector 115 (e.g., a processor, an FPGA, and/or a computing device) to compare the smoothed magnitude with a detection threshold 113. If the smoothed magnitude exceeds the detection threshold 113, the pulse detector 115 will identify the digital IQ signal as a SOI. Conversely, if the smoothed magnitude is less than the detection threshold 113, the pulse detector 115 will not identify the digital IQ signal as a SOI. If noise exceeds the detection threshold then the system will erroneously detect a signal and a false alarm will occur. In conventional systems the design engineer will endeavor to set the detection threshold to a level where the number of occurrences of false alarms and missed signals are both kept to acceptable levels.

The conventional system 100 uses a differencer 117 (e.g., a processor, an FPGA, and/or a computing device) to determine a phase difference between digital IQ signals taken of two samples taken over a known time period. The phase difference (i.e., change in angular position of the waveform of the signal) for a given time period between samples is then used to calculate a frequency 119 of the digital IQ signal. Frequency is expressed in terms of cycles per second (Hz) and is calculated, for example, according to:

$$\text{Frequency} = \frac{\Delta \varphi}{2\pi(\Delta t)} \qquad \text{Eqn. 3}$$

where $\Delta\varphi$, expressed in radians, is the change in phase of the signal over a period of time $\Delta t$, expressed in seconds.

Unfortunately, the conventional system 100 often suffers from poor SNR performance and is not considered to be a good approach to characterizing the system when others are available. In general, the channelizer 107 relies, for example, on a fast Fourier Transform (FFT) to identify and separate the various different data streams in the digital signal into individual signals. It should be noted that equation 1 above may not result in a magnitude that has an improved SNR as both the noise and the signal are squared. A considerably better result is obtained if an autocorrelation approach is used where a sample of the signal is cross-correlated with a subsequent sample of itself. Such an approach is implemented via a complex conjugate multiply (CCM) which is discussed in the next section.

An alternative approach to this process is to multiply a sample measurement, not by the complex conjugate of itself but by the complex conjugate of the next sample. In this case the noise power is not squared because the noise between samples is almost completely decorrelated, hence the peaks and valleys will tend to average themselves out. On the other hand the signals embedded in the measurement samples will not change much and hence they tend to multiply constructively. The result will be a product that is almost the square of either of the sample's individual amplitudes. Hence their SNR will improve significantly. This alternative approach is the essence of the '620 patent mentioned above and is used in support of the methods described with respect to the subject technology.

Figure 2:
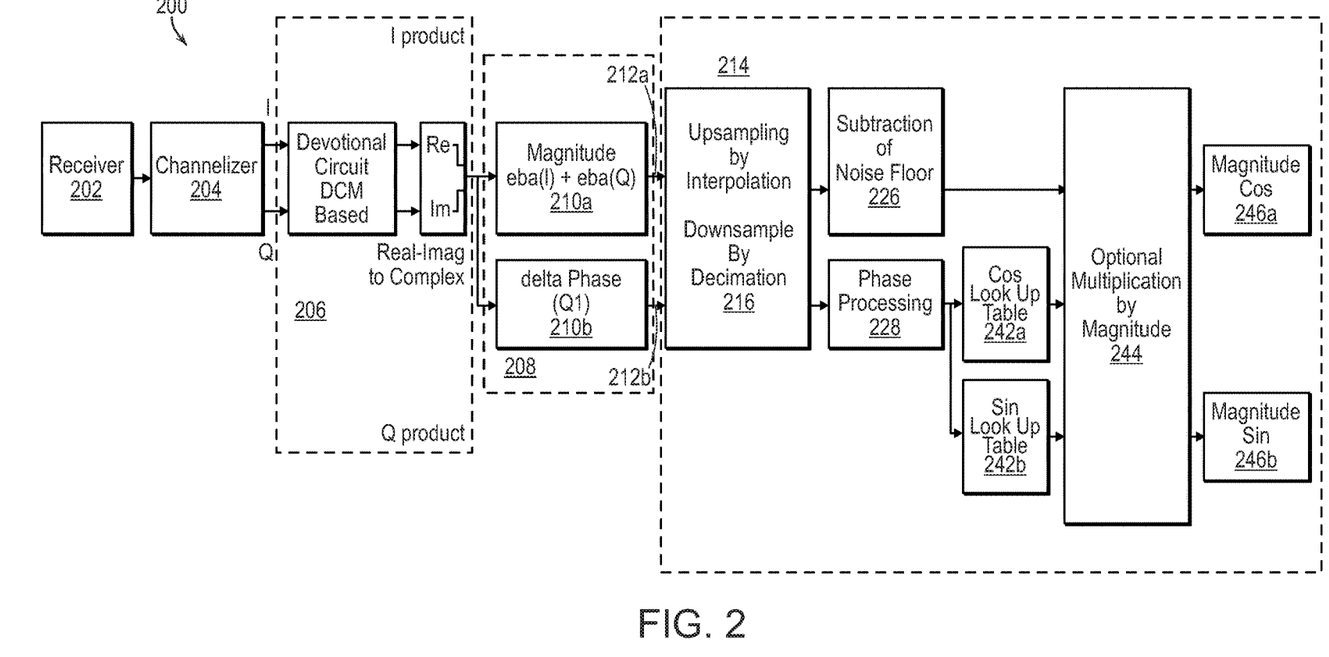
FIG. 2 is a block diagram of a system for signal detection and characterization and waveform reconstruction in accordance with the subject technology.

Referring now to FIG. 2, a block diagram of an improved system 200 for transforming and reconstructing the wavelength of a signal in accordance with the subject technology is shown. The system 200 improves the SNR of the conventional system 100 without the need for complex processing. The system 200 allows for modulating, demodulating, frequency shifting, and resampling of the signal in real time with minimal processing and without undesired effects. This extends receiver sensitivity and allows for the processing of signals that could not previously be detected because of low SNR.

At first, the system 200 receives an analog signal through a receiver 202. The receiver 202 can be an antenna or the like, configured to receive an external analog signal of interest (SOI). In particular, the analog SOI is received as a number of pulses or CW. The signal can then be processed, for example, by amplifiers and an ADC converter (not distinctly shown). The signal is then provided to a channelizer 204 which samples the signal and outputs in-phase (I) and quadrature (Q) components (collectively "IQ components") for each sample. The IQ components are then provided to processing elements which perform a delayed complex conjugate multiply (DCM) derotational operation on a current IQ sample and a delayed IQ (within derotational circuit 206) sample yielding improved SNR performance. The term derotation is used because the IQ vectors are no longer dependent on the sample number of the measurements being used but only the relative characteristics of the two consecutive samples. As a result the vectors do not in general rotate. As mentioned above the DCM can be applied, for example, in accordance with the teachings of the '620 patent.

In more detail, the derotational circuit 206 uses a current and previous sample of the signal to produce a constant product having an in-phase ($I_C$) component and a quadrature-phase ($Q_C$) component. The DCM is applied in accordance with:

$$DCM = A1\ \exp(j2\pi f^* T_S^* n)^* A2\ \exp(-j2\pi f^* T_S^* (n-1)) = A1A2\ \exp(j2\pi f^* T_S) \quad \text{Eqn. 4}$$

This produces a constant product, where $A \exp(j2\pi f^* T_S^* n)$ is a complex numerical expression of the current IQ sample of the signal $A2 \exp(-j2\pi f^* T_S^*(n-1))$ is a complex conjugate of the complex numerical expression of the previous IQ sample of the signal; A1 and A2 are is the signal magnitudes; f is the signal frequency; $T_S$ is the sample time; n is the sample number (running variable) (i.e., n correlates to the current sample and n−1 correlates to the previous sample); and j is the SQRT(−1). A1A2 exp $(j2\pi f^* T_S)$ is a constant product of the complex number expression of the current IQ sample and the complex conjugate of the complex number expression of the previous IQ sample. This constant product can be separated into real and imaginary components according to:

$$A1A2\ \exp(j2\pi f^* T_S) = A1A2\ \cos(j2\pi f^* T_S) + j^* A1A2\ \sin(j2\pi f^* T_S) \quad \text{Eqn. 5}$$

In the above formula, $A1A2 \cos(j2\pi f^* T_S) = I_c$ is the real component of the constant product, and $j^* A1A2 \sin(j2\pi f^* T_S) = Q_c$ is the imaginary component of the constant product. Thus, the signal is converted to real ($I_c$ and imaginary ($Q_c$) components of a constant product.

Reiterating, the derotational circuit 206 using DCM provides improved SNR performance over the conventional system 100 because, rather than relying on squared values, the DCM decorrelates noise by multiplying the complex number expression of the current IQ sample of the signal with a complex conjugate of the complex number expression of the previous IQ sample of the signal. Over a series of samples, the power of the SOI is correlated (thereby remaining constant) and fluctuations in the IQ values are caused by noise from the outside environment and added during processing which is uncorrelated from the sample. In this way, applying DCM advantageously decorrelates incoherent noise from the SOI. In some cases, multiple DCMs can be applied to multiple delayed samples, the averaged components resulting in further decorrelation of uncorrelated noise (relative to the multiple samples) and correlated SOI (relative to the multiple samples). This combination of I and Q components from multiple samples results in the conversion of the SOI to I and Q products.

After the SOI has been converted to I and Q products, filters (not distinctly shown) can be applied to further improve noise reduction properties by smoothing the I product and the Q product. Smoothing is advantageous because smoothing reduces the impact of noise on each component of the constant product for the SOI by removing obsolete sample data and deemphasizing outliers in the data stream. Further, in some cases, multiple DCMs can be applied through the derotational circuit 206. Smoothing can then be performed using averaged historical I and Q components for different samples. This results in better smoothing performance than when smoothing relies on I and Q data from a single sample point. Therefore, applying multiple DCMs, in various embodiments, advantageously provides additional improvements in low SNR performance for both magnitude and frequency determinations.

The system 200 also includes a converter 208 (comprising a magnitude converter 210a and a phase converter 210b) for converting an $I_c$ component (current sample I component) and $Q_c$ component (current sample Q component) into magnitude and phase components of the SOI. The converter 208 can calculate a DCM representation of the magnitude in accordance with:

$$(I1+jQ1)^*\text{Conj}(I2+jQ2) = \text{Real Product} + \text{Imaginary Product} \quad \text{Eqn. 6}$$

$$\text{Real Portion} = (I1^*I2 + Q1^*Q2) \quad \text{Eqn. 6a}$$

Imaginary Portion=$(I1*Q2+I2*Q1)j$            Eqn. 6b DCM Magnitude=abs (Real Portion)+abs (Imaginary Portion)            Eqn. 6c Here the magnitude is described in terms of signal strength, often expressed in terms of dB. Further, the converter 208 calculates a phase difference 1, expressed in radians, in accordance with the equation:

$$\Phi = \tan^{-1}\left(\frac{Q_C}{I_C}\right)$$            Eqn. 7

Phase represents a fraction of the wave cycle of the signal which has elapsed relative to the origin of that particular wave cycle at the time of sampling. In various embodiments, the converter 208 comprises, for example, one or more processors, FPGAs, microprocessors, and or any other suitable processing devices configured to apply Eqn. 6 (e.g., magnitude converter 210a) and/or Eqn. 7 (e.g., phase converter 210b) to the Ic component and the Qc component.

The waveform transformation and reconstruction of the subject application receives I and Q waveforms and transforms them into enhanced and/or new waveforms. The reconstructed magnitude and phase components 212a, 212b of the signal are first received by processing block 214 to increase SNR and smooth the signal before reconstruction. Filter 216 can then change the signal sampling rate by upsampling or downsampling (the magnitude and delta phase) by a processor, chip, ASIC, or the like. These processing techniques can be carried out in accordance with methods as are known in the art. For example, upsampling can be accomplished through linear interpolation to produce a sequence of additional samples that approximate the samples that would have been obtained at a higher sampling rate which can be relied upon for a more accurate reproduction of the signal's waveform. Additionally, or alternatively, a decimator can be used to downsample the signal using decimation to reduce the sampling rate.

Figure 3:
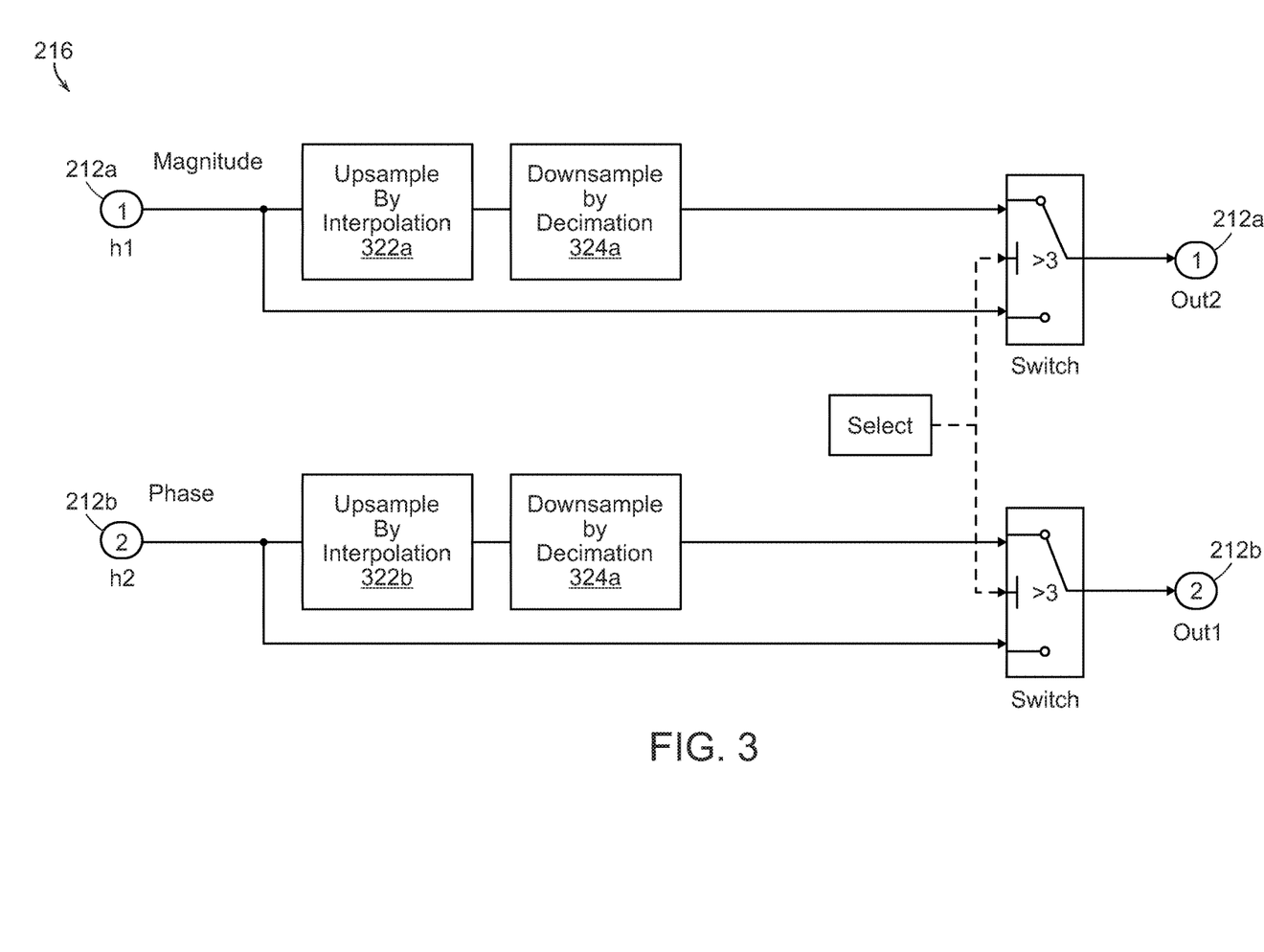
FIG. 3 is a block diagram of processing separate magnitude and phase components of a signal in accordance with the subject technology.

The aforementioned techniques can be applied to change the magnitude and/or the phase components of the signal separately. For example, referring now to FIG. 3, the magnitude component 212a and the phase component 212b can be independently modified by the same upsampling by interpolation in blocks 322a, 322b. Upsampling is done by linear interpolation of the delta phase. Note that the delta phase and the magnitude need to be interpolated at the same corresponding points so that the phase sand magnitude stay synchronized. Unlike conventional upsampling techniques, upsampling the separate magnitude and phase components 212a, 212b allows for upsampling without the creation of duplicate spectrum. Additionally, or alternatively, the magnitude component 212a and the phase component 212b can be separately downsampled by decimation in blocks 324a, 324b, respectively. This can be beneficial to reduce the sampling rate before reconstruction. After upsampling and/or downsampling, the magnitude and phase components 212a, 212b can be further processed and used to reconstruct the waveform of the signal for optional rebroadcasting by the system 200. It should be noted that upsampling and downsampling can be used in conjunction with one another. If the intent is to change the sample rate by three halves (3/2), for example, the sampling rate can be upsampled by three and then down sampled by two, thereby arriving at the desired sample rate.

Up and down sampling are not the only kinds of techniques available to construct or transform waveforms. Constants can be added to the delta phase values to increase or decrease frequency. Short impulse functions can be added to effect phase changes and quadratics can be applied to create modulations change as Chirp. In fact there aren't any obvious limitations to the functional forms that can be applied as long as the computing device can handle the throughput. As a result, the subject technology provides a way to make almost any kind of output without having to perform very complex processing.

Referring again to FIG. 2, in processing block 226, the noise floor can be estimated as a scalar value in the absence of a pulse or CW and can optionally be subtracted from the magnitude to yield an improved signal amplitude. As described above, applying DCM decorrelates noise from the SOI. Therefore once the magnitude component 212a for the signal has been separated, the noise floor estimate can be subtracted from the magnitude in block 226 before waveform reconstruction.

Figure 4:
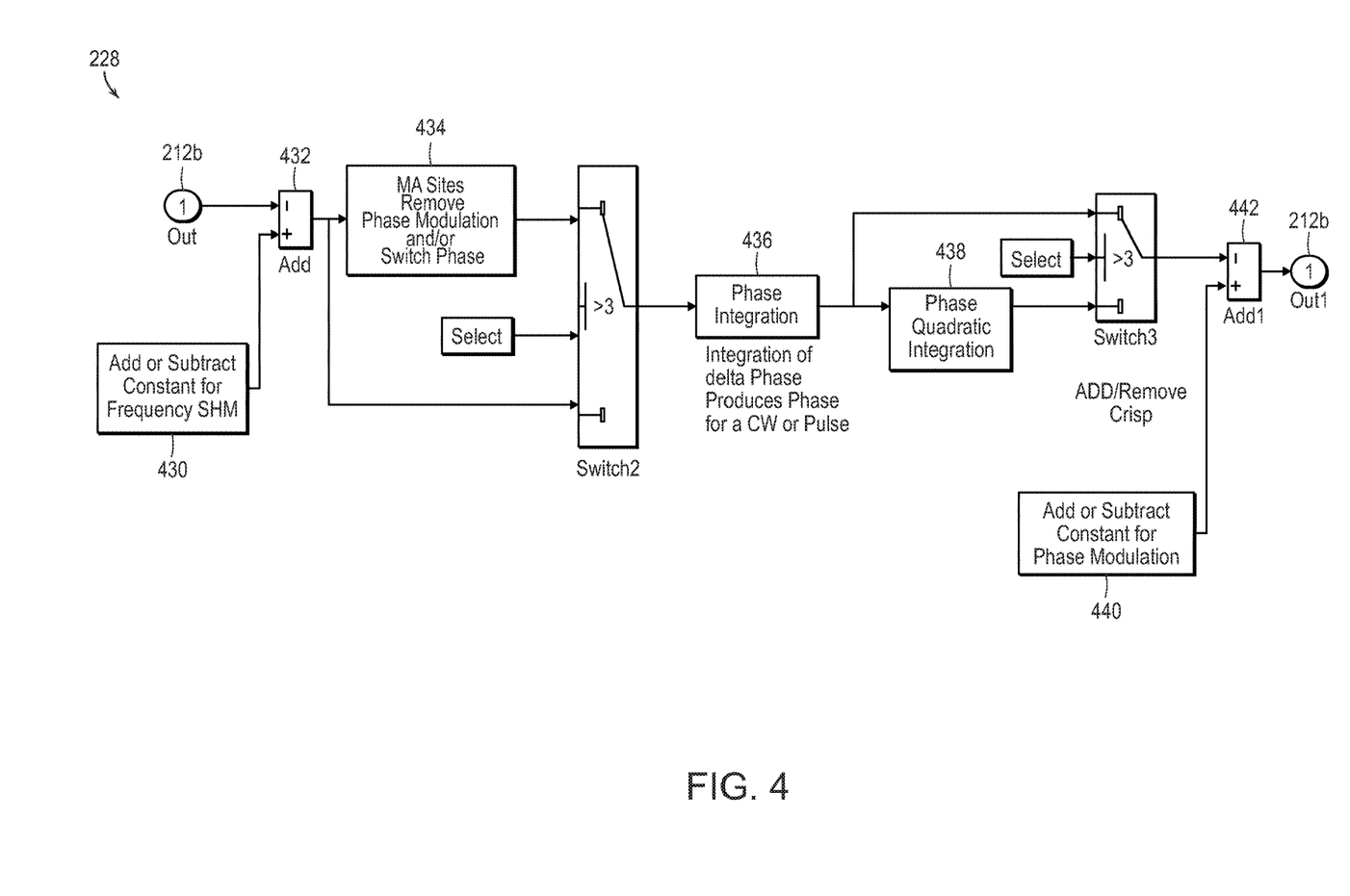
FIG. 4 is a block diagram of processing the phase component of a signal in accordance with the subject technology.

In block 228, the separate phase component 212b can be further processed, as shown in more detail in FIG. 4. For example, referring now to FIG. 4, in the phase processing block 228, a constant ("C" in Eqn. 8) can be generated in block 430 (e.g. via a processor, ASIC, FPGA, or the like). The phase component 212b can be modified by adding the constant from block 430, in block 432, causing a frequency shift by changing the slope of the phase in the integrated delta phase in the summation step. In this way, a frequency shift can be accomplished without incurring the burden of complex multiplication. These steps are shown in the equations below.

New Delta Phase($i$)=Old Delta phase($i$)+C (for each interpolated $i$, where $i$ indicates the sample number and runs from 1 through the total number of samples)            Eqn. 8

New Phase=$\Sigma_i$ New Delta Phase ($i$) (over all $i$)            Eqn. 9

Reconstructed cos=cos (New Phase)            Eqn. 10

Reconstructed Signal=DCM Magnitude*Reconstructed cos            Eqn. 11

If the signal of equation 11 is not modified (C=0) in equation 8, it represents the signal that came in the antenna except that it now has a greater magnitude and is de-noised. If it is desired to change the delta phase (which will lead to a change in frequency when it is integrated), then C is not set to zero, and the resulting waveform will be modified from the original input signal. It should also be noted that if the above processing is bound by the Nyquist criteria then interpolation should be performed first, prior to the above frequency shift.

In block 434, a simple moving average filter smooths or removes unwanted phase shifts. The longer the moving average, the more phase modulation is removed from the processing, but signal information may be lost. The shorter the average the more signal information is retained, but then the noise content is higher. The design engineer needs to consider this when determining the system's optimal implementation.

In block 436, integration of delta phase produces phase for CW or pulse based signals. The phase associated with a measurement is obtained by simply summing the delta phase.

In block 438 chirp can be added, removed, or altered through discrete quadratic integration of delta phase in accordance with: New Phase=$\Sigma$(deltaPhase)+/−k*$\Sigma$(deltaPhase)$^2$.

In block 440, another constant can be generated (e.g. via a processor, ASIC, FPGA, or the like) for phase modulation. Phase modulation is accomplished by adding a large spike at a single point to the phase where desired. Phase modulation can be accomplished in accordance with the following equations:

New deltaPhase$_i$=(deltaPhase$_i$)+$K_i$ (for any selected $i$ where a phase shift is desired)    Eqn. 12

New Phase=$\Sigma$(New deltaPhase)    Eqn. 13

As such, the constant $K_i$ from block 440 can then be added to phase component provided by block 212b in block 442. Alternatively, the phase component 212b can also be modified by subtracting the constant in block 442. The phase component 212b is then able to be further modified before waveform reconstruction.

Referring again to FIG. 2, between blocks 242a-246b the separate magnitude and phase components 212a, 212b are reconstructed into an IQ waveform. The phase component 212b can then be looked up in a cosine or sine lookup table (or via cordic), in blocks 242a, 242b respectively. This can be done in accordance with equation 11. In this way, the phase component 212b is used to reconstruct a waveform for the SOI. The reconstructed waveform can then be optionally multiplied by the processed magnitude component 212a to further reconstruct the waveform. To that end, in block 244, the waveform from the phase component can be multiplied by the processed magnitude component 212a, recombining magnitude and phase. Blocks 246 represents the signal being recombined using the waveform derived from the sine lookup table while block 246b represents the signal being recombined using the waveform derived from the cosine lookup table. In this way, a waveform for the SOI can be reconstructed based on the processed magnitude and phase components 212a, 212b. The separate magnitude and phase components are multiplied together and become the IQ waveform in block 244. From blocks 246a and 246b the signal, which is still in digital form, can be sent to a DAC for conversion into an analog signal for rebroadcasting. In some cases, the signal can also be provided to a power amplifier prior to rebroadcasting to increase signal power and extend link margin of the reconstructed signal. Ultimately, this process reproduces a signal that, unless intentionally modified, represents the signal that came into the antenna except that it now has a greater magnitude and is de-noised.

The processing block 214 can also include additional filters (not distinctly shown), for example, to smooth the separate magnitude and phase components 212a, 212b. Smoothing can be accomplished, for example, by using a moving average filter to reduce the impact of noise on the signal by removing obsolete sample data and deemphasizing outliers in the data stream, providing a cleaner signal. Smoothing is advantageous because smoothing reduces the impact of noise on each component of the constant product by removing obsolete sample data and deemphasizing outliers in the data stream.

As described above, the system 200 allows for the SOI to be reconstructed and optionally rebroadcast after being broken down into separate magnitude and phase components 212a, 212b which are processed and modified separately before being recombined. This allows for frequency shifting without complex multiplication, demodulation, modulation, and upsampling or downsampling that generates real output to input into a DAC with no undesired spectral components. Overall, this allows the acquired SOI to be optionally modified before being rebroadcast with a higher SNR without requiring complex processing. Note that shifted frequencies are bound by the Nyquist criteria and care must be taken when decimating samples. If the decimation leads to frequencies above the Nyquist criteria an incorrect frequency may be generated.

Figure 5:
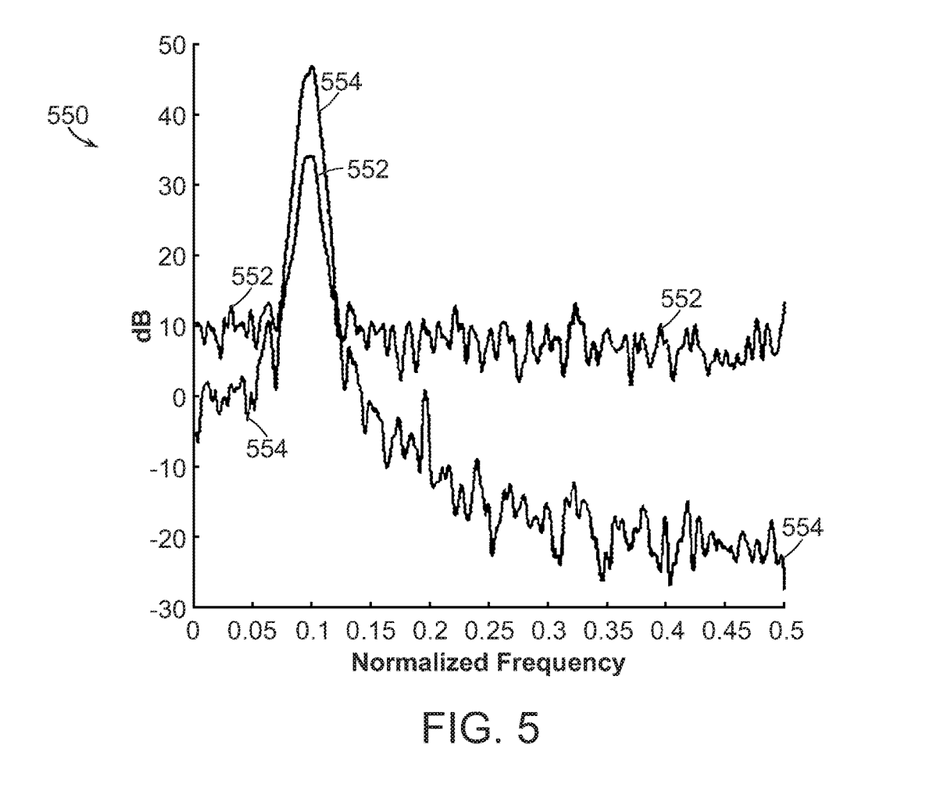
FIG. 5 is a graph comparing the original waveform of an SOI with a reconstructed waveform in accordance with the subject technology.

Referring now to FIG. 5, a graph 550 comparing a waveform 552 for a SOI and a reconstructed waveform 554 in accordance with the subject technology are shown. Notably the reconstructed waveform 554 exhibits higher output power with less noise. This is the result of noise removal by derotation, filtering of the IQ products, and filtering of the processed magnitude and phase components, in accordance with the techniques described above. The system 200 does not rely on estimating system parameters, and processes the phase and magnitude contained in the IQ data through the derotational algorithm, transforming and reconstructing an IQ waveform. This can improve the link margin of the system 200 and allow the reconstructed IQ waveform 554 to be rebroadcast at an increased power. The system 200 can also act as a repeater, automatically amplifying and rebroadcasting the received signal continuously. Additionally, the system 200 can be used to effectuate jamming of the system from which the signal was originally broadcast. To do so, the IQ products or phase can be modified prior to rebroadcasting such that the rebroadcast IQ waveform acts as a jamming signal as to the system which initially broadcast the SOI.

It will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiments. Also, functional elements (e.g. processors, circuits, filters, receivers, and the like) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A method for transforming and reconstructing a signal comprising:
  receiving a plurality of samples of a waveform of the signal at different points in time;
  transforming the waveform of the signal, for each sample, into an in-phase (I) component and a quadrature (Q) component;
  determining, with a derotational circuit, a constant product for the signal by applying a delayed complex conjugate multiple (DCM) to the signal using the I components and the Q components of the samples, the constant product having an I component ($I_c$) and a Q component ($Q_c$);
  determining a magnitude component based on $I_c$ and $Q_c$;
  determining a delta phase component based on $I_c$ and $Q_c$;
  separately processing the magnitude component and the delta phase component to create a processed magnitude component from the magnitude component and a processed delta phase component from the delta phase component; and creating an IQ waveform by reconstructing the waveform of the signal based on the processed magnitude component and the processed phase component.

2. The method of claim 1, wherein creating the IQ waveform includes determining a waveform based on the processed delta phase component and multiplying said waveform by the processed magnitude component.

3. The method of claim 2, further comprising rebroadcasting the IQ waveform.

4. The method of claim 1, wherein processing the magnitude component comprises at least one of the following: upsampling by interpolation; downsampling by decimation.

5. The method of claim 1, wherein processing the delta phase component comprises at least one of the following: upsampling by interpolation; downsampling by decimation.

6. The method of claim 1, wherein creating the IQ waveform comprises summing a plurality of processed delta phase values and using a lookup table.

7. The method of claim 1 wherein processing the delta phase component includes frequency shifting by modifying the delta phase component by a constant.

8. The method of claim 1 wherein processing the magnitude component includes subtracting a noise floor.

9. The method of claim 1, wherein processing the delta phase comprises optionally adding chirp.

10. The method of claim 1, wherein processing the delta phase comprises demodulation by removing chirp.

11. The method of claim 1, wherein processing the delta phase comprises adding a phase shift by adding a spike.

12. The method of claim 1, further comprising, after determining the constant product, smoothing $I_c$ and $Q_c$.

13. The method of claim 1, wherein determining the delta phase component is given by:

$$\Phi = \tan^{-1}\left(\frac{Qc}{Ic}\right).$$

14. The method of claim 1, further comprising, after determining the constant product, smoothing $I_c$ and $Q_c$, wherein:

processing the magnitude components comprises: upsampling by interpolation or downsampling by decimation; and subtracting a noise floor; and processing the delta phase component comprises: upsampling by interpolation or downsampling by decimation; modulation or demodulation; and adding a phase shift.

15. The method of claim 3, wherein prior to rebroadcasting a power amplifier is applied to the signal such that the IQ waveform is rebroadcast at an increased power and decreased noise to extend link margin.

16. The method of claim 3, wherein rebroadcasting the IQ waveform is done continuously to act as a repeater.

17. The method of claim 3, wherein prior to rebroadcasting, the IQ waveform is modified to act as a jamming signal.

* * * * *